(12) United States Patent
King et al.

(10) Patent No.: US 8,203,764 B2
(45) Date of Patent: Jun. 19, 2012

(54) PHASED ILLUMINATION METHOD FOR IMAGE CAPTURE SYSTEM

(75) Inventors: Anthony Michael King, Lexington, KY (US); Mark Eric Miller, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 1307 days.

(21) Appl. No.: 11/768,990

(22) Filed: Jun. 27, 2007

(65) Prior Publication Data

US 2009/0002774 A1     Jan. 1, 2009

(51) Int. Cl.
*H04N 1/387* (2006.01)
*G06K 9/32* (2006.01)

(52) U.S. Cl. ...... 358/450; 358/509; 358/3.26; 358/3.27; 382/268; 382/269; 382/284; 382/294; 382/275

(58) Field of Classification Search .................. 358/474, 358/450, 509, 3.26, 3.27; 382/268, 269, 382/284, 275, 294
See application file for complete search history.

(56) References Cited

U.S. PATENT DOCUMENTS

| | | | | |
|---|---|---|---|---|
| 5,721,624 A * | 2/1998 | Kumashiro et al. | ........... | 358/450 |
| 5,982,951 A * | 11/1999 | Katayama et al. | ............ | 382/284 |
| 6,002,430 A * | 12/1999 | McCall et al. | ........... | 348/207.99 |
| 6,005,987 A * | 12/1999 | Nakamura et al. | ............ | 382/294 |
| 6,128,416 A * | 10/2000 | Oura | .............................. | 382/284 |
| 6,133,943 A * | 10/2000 | Needham | .......................... | 348/37 |
| 6,359,617 B1 * | 3/2002 | Xiong | ........................... | 715/848 |
| 6,445,819 B1 * | 9/2002 | Kinjo | ............................ | 382/173 |
| 6,498,867 B1 * | 12/2002 | Potucek et al. | ............... | 382/274 |
| 6,744,931 B2 * | 6/2004 | Komiya et al. | ............... | 382/284 |
| 7,076,116 B2 * | 7/2006 | Horie | ............................. | 382/284 |
| 7,450,137 B2 * | 11/2008 | Deng et al. | .................... | 345/629 |
| 7,756,358 B2 * | 7/2010 | Deng et al. | .................... | 382/294 |
| 7,920,300 B2 * | 4/2011 | Nakaya et al. | ................ | 358/474 |
| 2001/0033701 A1 * | 10/2001 | Okisu et al. | .................. | 382/284 |

* cited by examiner

*Primary Examiner* — Twyler Haskins
*Assistant Examiner* — Dennis Dicker

(57) ABSTRACT

Imaging devices and methods that permit the capture of digital images of an original document sequentially illuminated by a plurality of light sources. In one aspect, a first digital image is captured using illumination from a first illumination angle, a second digital image is captured using illumination from a second illumination angle, and the first and second digital images are combined to obtain a composite digital image of the document. The obtained composite digital image is free of reflection artifacts corresponding to the first and second illumination angles.

17 Claims, 12 Drawing Sheets

PHASED ILLUMINATION METHOD FOR IMAGE CAPTURE SYSTEM

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to imaging devices and imaging methods, and more particularly to those permitting the capture of high resolution digital images of an original illuminated by light sources located outside of the optical field of view of an image sensor.

2. Description of the Related Art

Document copying devices are used in a variety of applications. These devices may be part of an all-in-one unit that includes scanning, printing, and facsimile functions. Alternatively, a document imaging device may be a stand-alone device, capable only of copying documents. Historically, imaging devices include a drive mechanism that moves a scan bar across a target document. In these devices, a document is scanned line-by-line, and the data downloaded to a processor. This data is combined to form a final two-dimensional image of the document. These imaging devices require precise movement of the scan bar to prevent registration defects. Accordingly, quality scans require intricate mechanisms which are often costly and complex.

Copying devices, whether of the all-in-one or independent variety, are popular for both business and personal use. Ideally, the devices are designed to have a size that enables placement within small workspaces such as desk tops and bookshelves. As a result, size is often an important aspect when deciding to purchase a imaging device. Other factors being equal, smaller devices are usually preferred because of their improved ability to fit where needed and to occupy a minimum space. Along with size, the price of the device is another important aspect during purchase. A device meeting other requirements may not be acceptable because of a higher price.

Digital photography technology has progressed so that image sensors that produce high-quality, two-dimensional images in a single capture step are now available. Image sensors including millions of sensor elements are readily available. These image sensors have also become more economical, allowing them to be utilized in new applications such as document imaging. An image sensor may have a substantial field of view, such that with appropriate placement within the imaging device the image sensor is able to capture most or all of a document original in a single image capture step. However, the relatively large field of view creates space and illumination complications. Improper placement of illumination sources may cause reflections that are manifested as reflection artifacts in the captured image. Placement of illumination sources to minimize reflection artifacts may in turn create difficulties in providing uniform illumination across the image target bed.

In addition to size and price, power consumption and component reliability are also important factors in consumer and business products. All of the preceding issues must be considered in designing a new imaging device.

SUMMARY

A method of generating a digital image of a document disposed on a target bed of an imaging device is disclosed. In one or more embodiments, the method comprises capturing a first digital image of the document using illumination from a first illumination angle; capturing a second digital image of the document using illumination from a second illumination angle; and combining the first and second digital images to obtain a composite digital image. The composite digital image thus produced is free of reflection artifacts that might otherwise be present in an image document as a consequence of the relative positioning of the illumination sources and the image sensor relative to the target bed.

Capturing the first or second digital image may comprise receiving image data from an array of image sensor elements and cropping the image data to obtain the first or second digital image. Alternatively, capturing the first or second digital image may comprise receiving image data from a subset of an array of image sensor elements disposed in the image sensor.

Combining the first and second digital images may comprise merging data from each of the first and second digital images that correspond to an overlap between the two images.

Illumination may be provided directly, or by reflecting light onto the image area. Illumination may be provided by a light source approximating a point source, or by an array of light elements.

Various embodiments of imaging devices for implementing the above methods are also disclosed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

Figure 1:
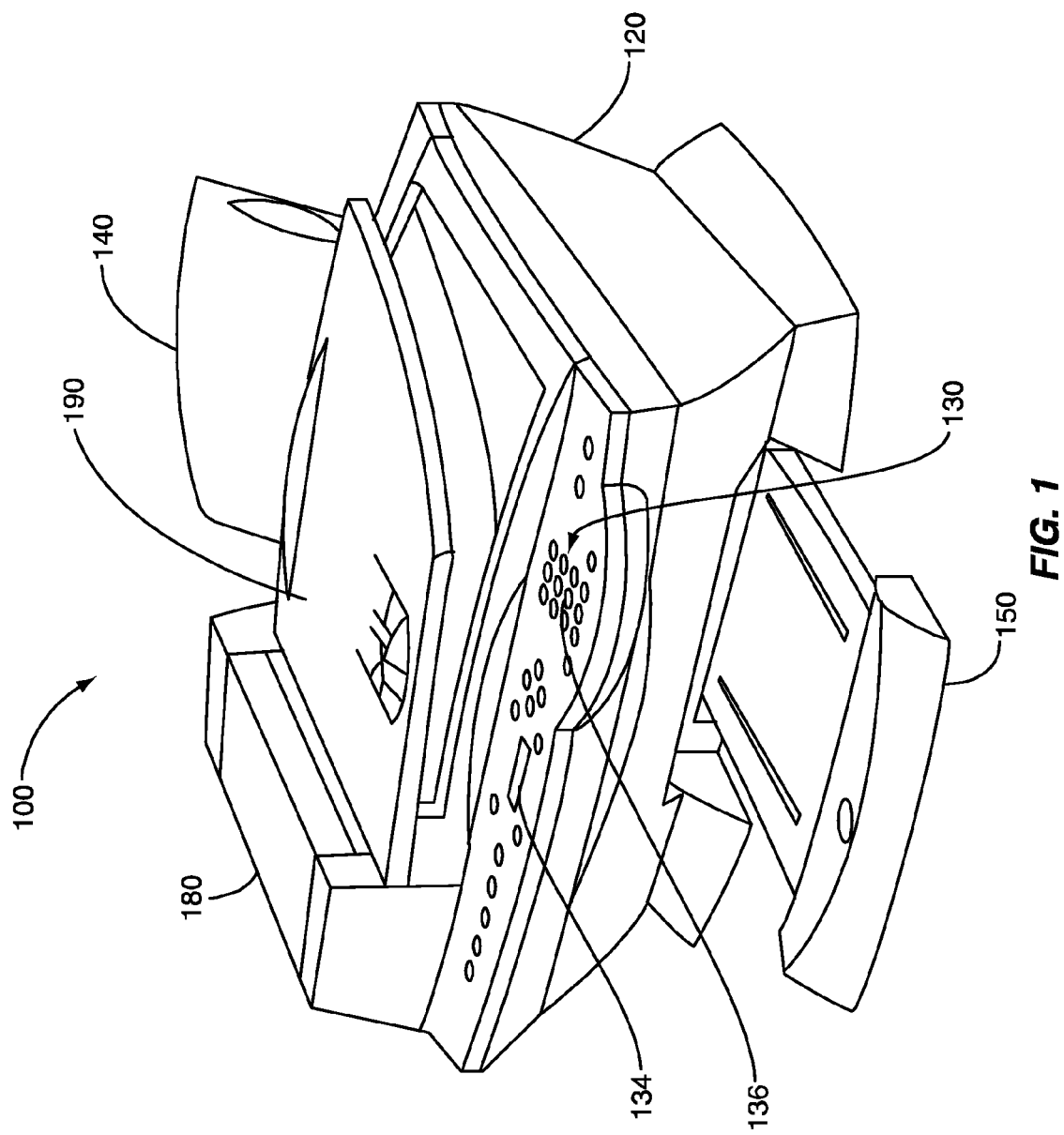
FIG. 1 is a perspective view of an imaging device.

An exemplary imaging device 100 is illustrated in FIG. 1. This imaging device 100 features both copying and printing capabilities. Imaging device 100 comprises an exterior housing 120; a user interface 130, including a display 134 and a keypad 136; an image sensor (not visible in FIG. 1); at least one media input tray 140 adapted to hold a stack of print media; a media output tray 150; and a document handler 180. In the pictured embodiment, the document handler 180 is integrated into a cover 190 that may be lifted to expose a target bed (not visible in FIG. 1) on which individual target documents may be placed for subsequent scanning. Internal components for performing imaging functions are not visible in the exterior view illustrated in FIG. 1.

Figure 2:
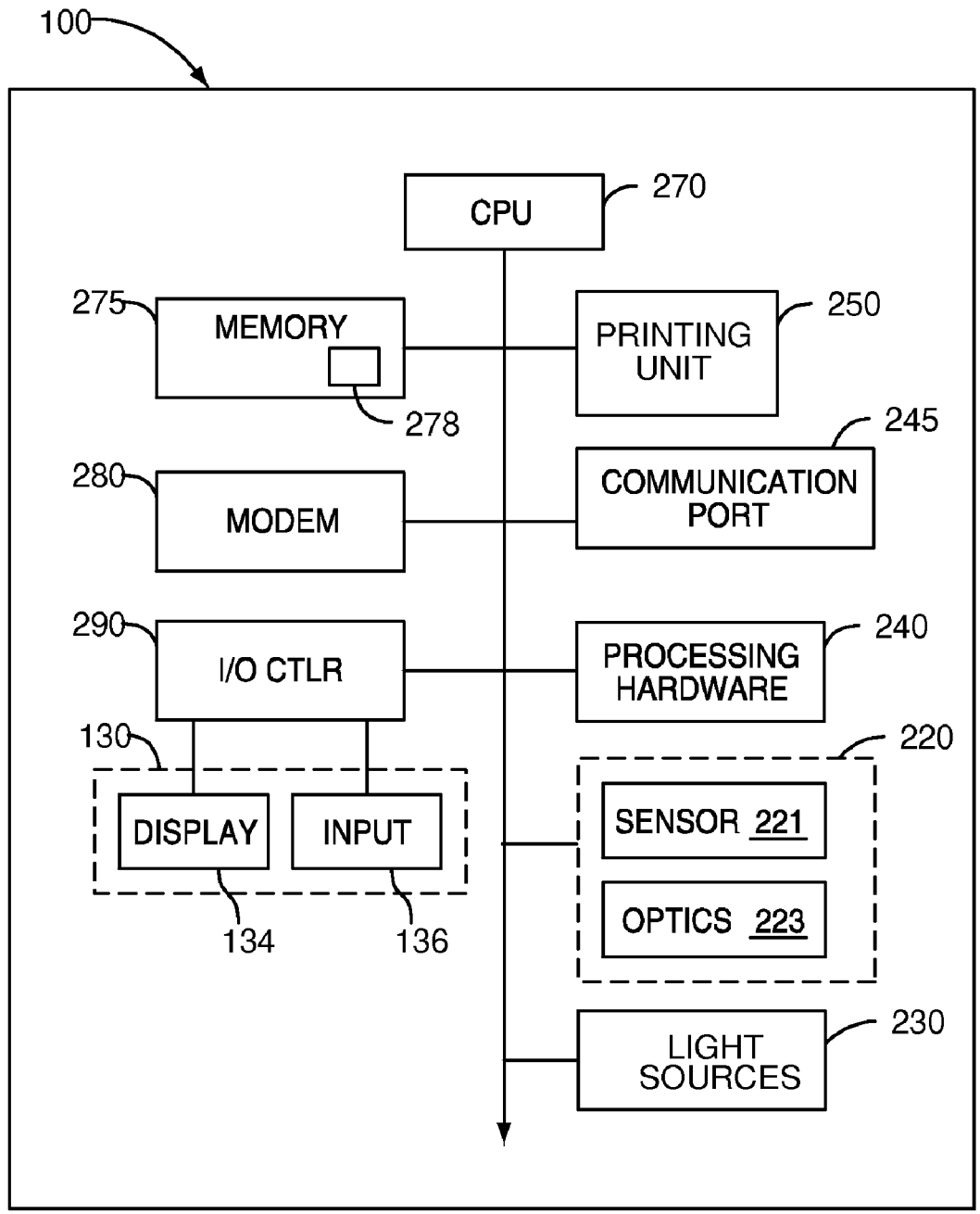
FIG. 2 is a block diagram of a imaging device.

FIG. 2 provides a simplified representation of some of the various functional components of the device 100 of FIG. 1. For instance, the imaging device 100 includes an image sensor 220 as well as a printing unit 250, which may itself include a conventionally known ink jet or laser printer with a suitable document transport mechanism. Interaction at the user interface 130 is controlled with the aid of an I/O controller 290. The I/O controller 290 generates user-readable graphics at the display 134 and interprets commands entered at the keypad 136 or from the display 134.

The device 100 may also include one or more processors 270, system memory 275, which generically encompasses RAM and/or ROM for system operation and code storage as represented by numeral 278. The system memory 275 may suitably comprise a variety of devices known to those skilled in the art such as SDRAM, DDRAM, EEPROM, Flash Memory, and perhaps a fixed hard drive. Those skilled in the art will appreciate and comprehend the advantages and disadvantages of the various memory types for a given application.

Illumination of the target document during imaging operations is provided by light sources 230. As will be explained in more detail below, light sources 230 comprise two or more illumination sources, configured to sequentially illuminate the target document while image sensor 220 captures digital images of the document. Control of the light sources 230 and image sensor 220 is provided by processor 270.

Additionally, the device 100 may include image processing hardware 240, which may be a separate hardware circuit, or may be included as part of other processing hardware. For example, control of the image sensor 220 and of subsequent image processing may be implemented via stored program instructions for execution by one or more Digital Signal Processors (DSPs), ASICs or other digital processing circuits included in the processing hardware 240. Alternatively, stored program code 278 may be stored in memory 275, with the control techniques described herein executed by some combination of processor 270 and processing hardware 240, which may include programmed logic devices such as PLDs and FPGAs.

The device 100 may also be coupled to a computer or computer network (not shown) through a compatible communication port 245, which may comprise a standard parallel printer port, a serial data interface such as USB 1.1, USB 2.0, IEEE-1394 (including, but not limited to 1394a and 1394b) and the like. Device 100 may also include integrated wired or wireless network interfaces. Therefore, communication port 245 may also represent a network interface, which permits operation of the device 100 as a stand-alone device. A wired communication port 245 may comprise a conventionally known RJ-45 connector for connection to a $^{10}/_{100}$ LAN or a $^{1}/_{10}$ Gigabit Ethernet network. The wireless communication port 245 may comprise an adapter capable of wireless communications with other devices in a peer mode or with a wireless network in an infrastructure mode. Accordingly, the wireless communication port 245 may comprise an adapter conforming to wireless communication standards such as Bluetooth®, the various 802.11 standards, 802.15 or other standards known to those skilled in the art.

FIG. 2 also illustrates image sensor 220, which includes a sensor array 221 and optics 223. Exemplary types of sensors 221 may include CCD and CMOS sensors. Multilayer direct image sensors may also be used. The optics 223 may comprise different types of elements, such as some combination of mirrors, prisms, lenses, and beam splitters. The optical lenses may be wide angle or telephoto lenses adapted to focus an image of an original document onto the sensor 221 with minimum distortion or other optical aberrations. Other types of lenses may be used where appropriate. Sensor arrays 221 that may be used include digital CMOS imaging modules, typically used in digital cameras, that currently are available in various megapixels (MP) sizes and are available from several manufacturers.

Finally, FIG. 2 illustrates a modem 280 and communication port 245, which may be used, either wired or wireless, to connect imaging device 100 to a computer network. When connected to a computer network, device 100 may receive document files for printing, and may transmit document images created by device 100 to computers attached to the network. Modem 280 may be a fax modem compliant with commonly used ITU and CCITT compression and communication standards such as the V.XX and Class 1-4 standards known by those skilled in the art.

Image sensor 220 may include a color sensor array 221 or a monochrome sensor array 221. In certain implementations, systems using a color camera chip are adversely affected by the color masking that is typically used on the sensor 221 chip to produce the full color image. To alleviate some of these problems, an imaging device 100 may instead incorporate a monochrome sensor array 221, and use sequential red-green-blue illumination to form a digital image. That is, an original document is exposed to different colors in sequence and digital images, or "color planes" corresponding to each of the illuminations are captured using the full monochrome sensor array 221 in image sensor 220. Then, color processing may be implemented using the color planes to create a full color image. Those skilled in the art will readily appreciate that parameters such as exposure, gain, gamma correction, illumination, filtering, calibration, and color table for each color can be independently controlled or digitally compensated for better color fidelity.

Figure 3:
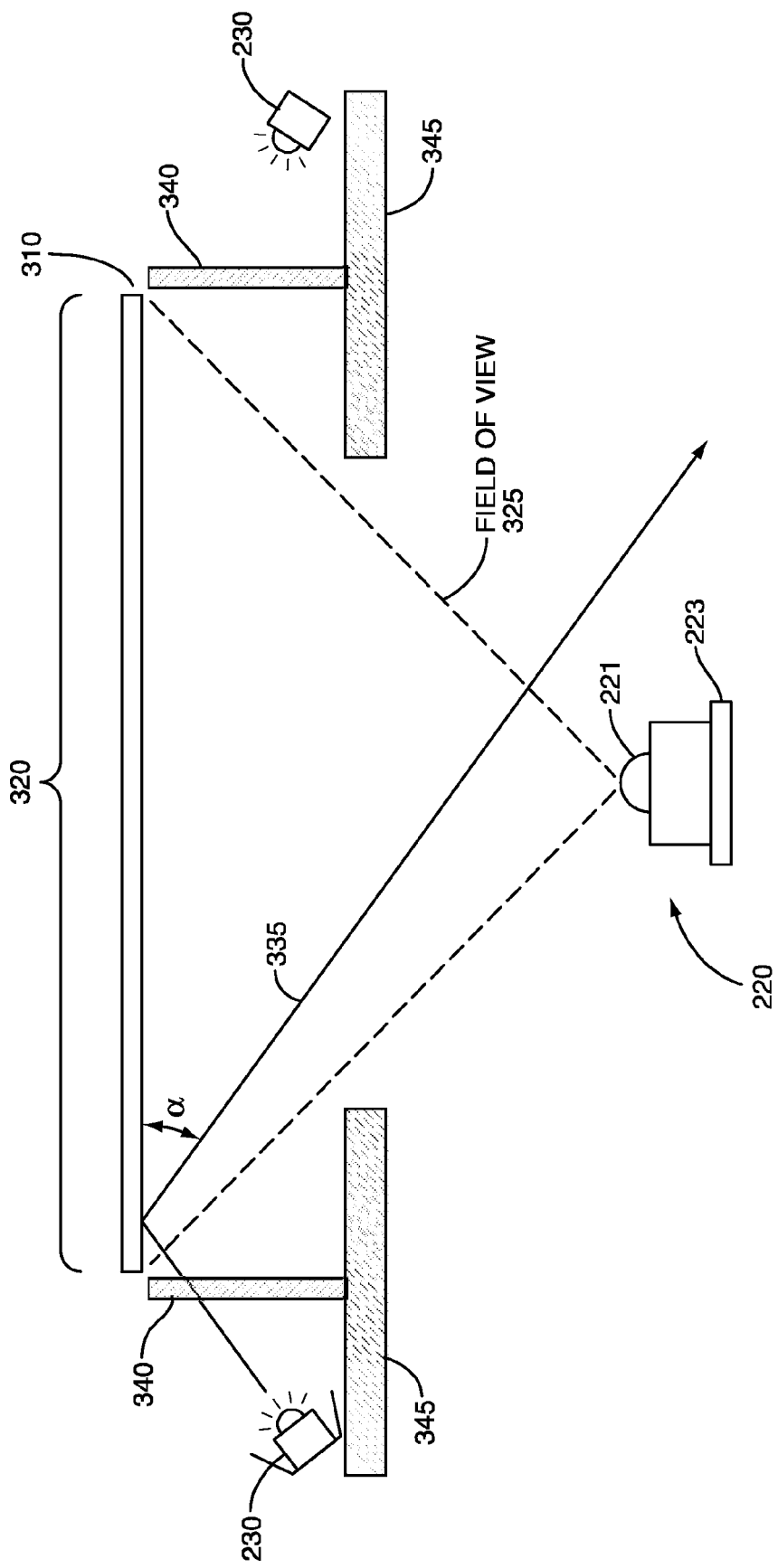
FIG. 3 is a schematic view of an imaging device illustrating illumination sources disposed outside of an image sensor field of view.

FIG. 3 illustrates an image sensor 220 disposed within device housing 120 and configured to capture a digital representation of an original document positioned on a transparent scan bed 310. In this particular embodiment, an original document may be placed on top of the scan bed 310, with the side to be imaged facing down, towards image sensor 220.

The image sensor 220 includes a two-dimensional array of sensor elements 221 that "see" an image area 320 on the scan bed 310. In other words, the optics 223 coupled to the sensor array 221 provide a field of view 325 corresponding to the image area 320. Thus, the image area 320 is a planar region extending in length-wise direction as shown in FIG. 3, and having a width extending in a direction normal to the view shown in the figure.

One approach to illuminating a document in an imaging device is illustrated in FIG. 3. Illumination of the document is provided by illumination sources 230. Light from illumination sources 230 passes through diffusers 340 and through transparent scan bed 310 to illuminate a document disposed on top of scan bed 310. For optimal imaging, illumination of target bed 310 should be as uniform as possible; diffusers 340 in FIG. 3 help spread the light to provide more uniform illumination. Illumination sources 230 should also be positioned so they do not become a part of the image that is being captured. Accordingly, in the embodiment pictured in FIG. 3, the illumination sources 230 are disposed outside of the field of view 325. Finally, reflections from illumination sources 230, as well as secondary reflections off the image sensor 220 housing and lenses should be minimized. Light shields 345 are positioned to prevent light from illumination sources 230 from traveling directly to the image sensor 220.

In FIG. 3, illumination source 230 projects light at an acute angle to the scan bed 310. The scan bed 310 reflects specular light 335 at a reflection angle α. Because of the positioning of illumination sources 230 in FIG. 3, reflected specular light 335 does not reach the image sensor 220, and thus does not create reflection artifacts in digital images captured by image sensor 220. However, the angle α of reflection also affects the illumination intensity upon the target document, as well as the uniformity of the illumination. At too shallow of an angle α, the intensity and uniformity of illumination may suffer. While diffusers 340 aid in providing more uniform illumination, they are also lossy, requiring the use of brighter illumination sources 230. The simultaneous use of two illumination sources 230 disposed at opposite sides of target bed 310, as shown in FIG. 3, may also aid in providing more uniform and more intense illumination. Indeed more than two illumination sources 230 may be employed. However, the use of additional illumination sources 230 obviously increases the cost and complexity of the imaging device.

Figure 4:
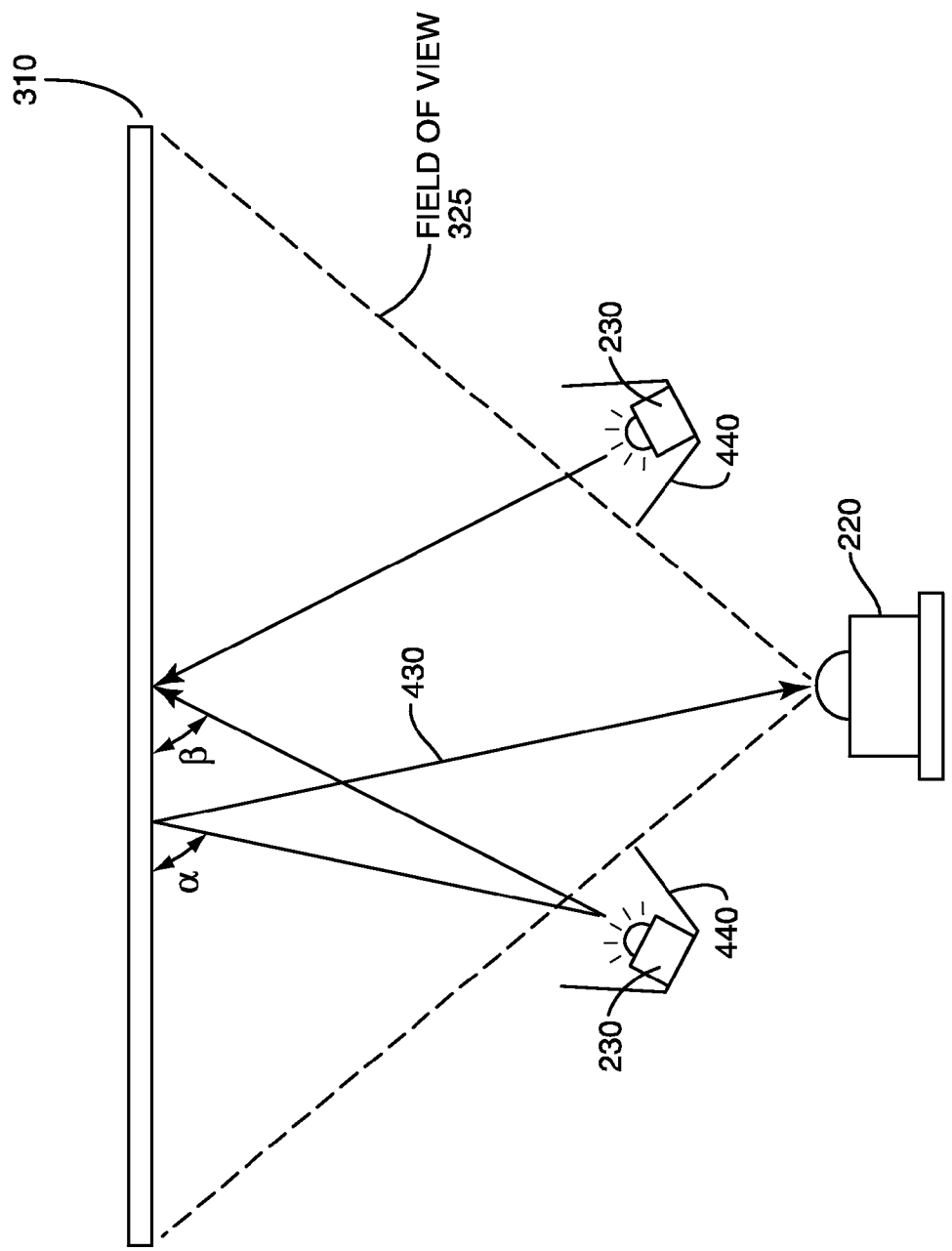
FIG. 4 is a schematic view of an imaging device illustrating an illumination source disposed at an angle causing specular reflection within an image sensor field of view.

In FIG. 4, illumination sources 230 are positioned at an illumination angle β with respect to the scan bed 310. This illumination angle is substantially greater than that of FIG. 3. As a result, because the illumination of the scan bed 310 is more direct, the intensity of illumination sources 230 can be reduced. Additionally, the need for diffusers may be reduced or eliminated. Direct illumination of the imaging unit 220, which might cause secondary reflections from the imaging unit 220 housing, is prevented with light shields 440. These lights shields 440 should optimally be disposed to prevent direct illumination of other light sources as well, again to prevent secondary reflections. The use of a greater illumination angle β thus eases the provision of uniformly intense illumination of the scan bed.

However, the use of a larger illumination angle β creates reflection artifacts in digital images captured by image sensor 220. FIG. 4 illustrates that some of the light from illumination source 230 is reflected from the scan bed 310 at an angle α. The reflected specular light 430 reaches image sensor 220. The reflected specular light 430 appears to the image sensor 220 to have come from within the image area 320, and thus produces a "reflection artifact" on any digital images of the image area 320 captured by image sensor 220.

Figure 5A:
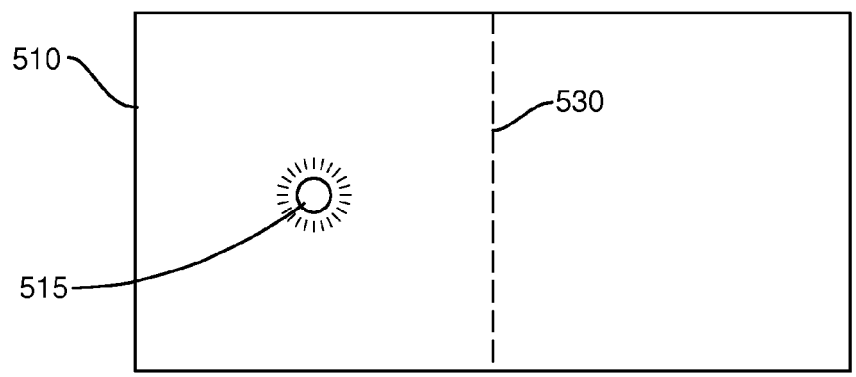
FIGS. 5A-C illustrate images captured by an image sensor and a composite image formed from the captured image.
Figure 5B:
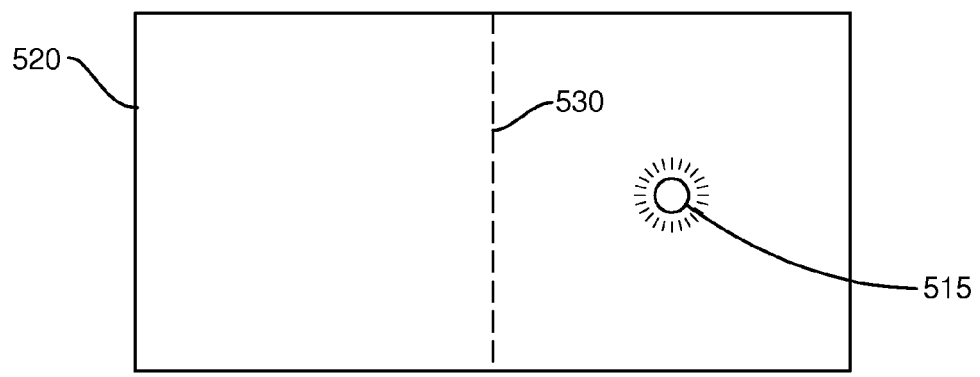

If the scan bed 310 is illuminated by only a single illumination source 230, a single reflection artifact will appear in a full-field image captured by image sensor 220. FIG. 5A illustrates an image 510 captured by the image sensor 220 in accordance with the configuration of FIG. 4, wherein only the left-hand illumination source 230 is activated during the image capture process. As seen in FIG. 5A, a reflection artifact 515 appears in the left half of the captured image. The exact location of the reflection artifact 515 within the image 510 depends on the precise geometry of the position of scan bed 310, illumination source 230, and image sensor 220. FIG. 5B illustrates an image 520 captured by the image sensor 220 in accordance with the configuration of FIG. 4, wherein only the right-hand illumination source 230 is activated during the image capture process. As seen in FIG. 5B, a reflection artifact 515 appears in the right half of the captured image. Thus, each of images 510 and 520 include one portion unmarred by reflection artifacts, and another portion distorted by a reflection artifact 515.

Figure 5C:
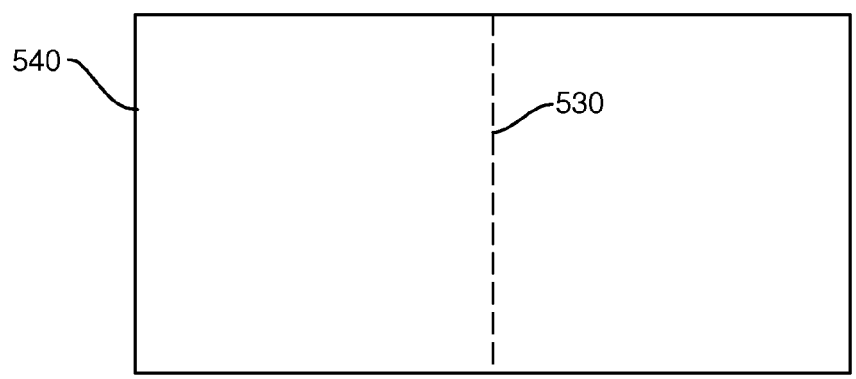

If the images 510 and 520 are captured sequentially, during sequential illuminations from the left-hand light source 230 and the right-hand light source 230, the resulting images can be processed and combined to form a composite image free from reflection artifacts 515. Specifically, image 510 can be "cropped" along a line 530 midway through image 510, so that the portion of the image containing the reflection artifact 515 is discarded. Image 520 can be processed the same way. Because the reflection artifact 515 in FIG. 5B is in the opposite half, the portion remaining after cropping image 520 will correspond directly to the half discarded from image 510. The artifact-free portions remaining after cropping images 510 and 520 may thus be combined to form a composite image 540, as illustrated in FIG. 5C. The resulting composite image 540 is artifact-free, and corresponds to the image area 320 of FIG. 4.

Figure 6:
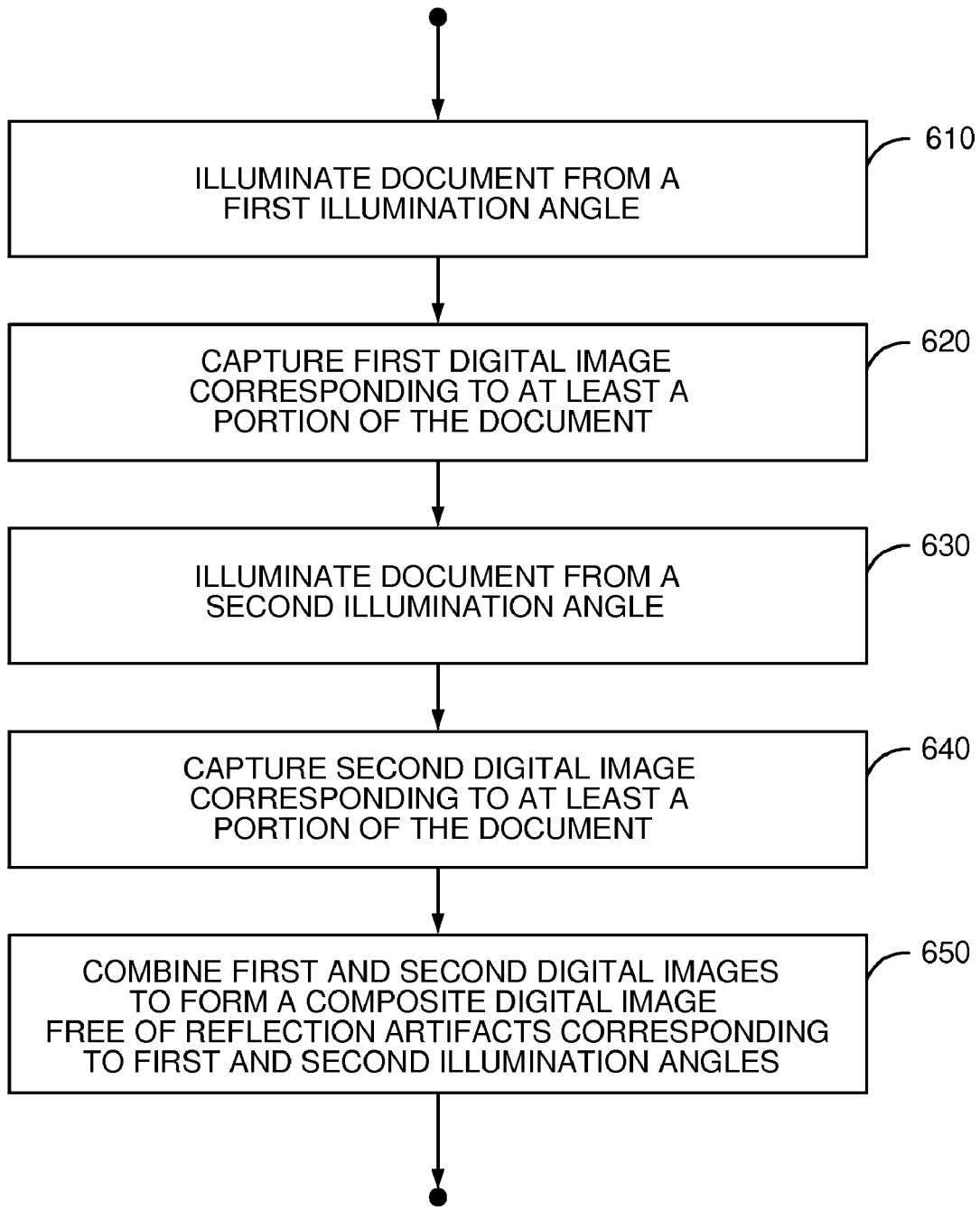
FIG. 6 is a flow diagram depicting a process by which a document is illuminated and a composite digital image is produced.

FIG. 6 thus illustrates a method, in accordance with one embodiment of the present invention, of generating an image of a document disposed on a scan bed 310. Block 610 depicts the illumination of the target document from a first illumination angle. In the embodiment shown in FIG. 4, this first illumination may come from left-hand illumination source 230, at illumination angle β. Block 620 depicts the capturing of a first digital image by image sensor 220 during this first illumination. As explained above, because of the positioning of the light sources 230 with respect to scan bed 310 and image sensor 220, a reflection may be present in the field of view 325 of the image sensor 220. If the first digital image captured by image sensor 220 covers the entire image area 320, the image will thus include a reflection artifact 515 in the left-hand portion, as with image 510 illustrated in FIG. 5A. (As will be explained further below, the first digital image may optionally cover less than the full image area 320.)

Block 630 depicts a second illumination of the document, from a second illumination angle. In the embodiment of FIG. 4, the second illumination may come from the right-hand illumination source 230. During this second illumination, a second digital image is captured by image sensor 220, as depicted in Block 640. As with the first digital image, this second digital image may include a reflection artifact 515, although in this case the reflection artifact 515 will be present in the right-hand portion of the captured image, as illustrated with image 520 of FIG. 5B.

Finally, Block 650 depicts the processing of the first and second digital images to form a composite digital image corresponding to the image area 320. This composite image is free of reflection artifacts caused by the positioning of light sources 230 relative to the target bed 310 and image sensor 220. As explained above, in one embodiment of the present invention, the captured first and second digital images may be cropped to remove a portion of each containing a reflection artifact 515. The portions remaining after cropping may then be combined to form the composite digital image, as illustrated with image 530 in FIG. 5C.

Figure 7A:
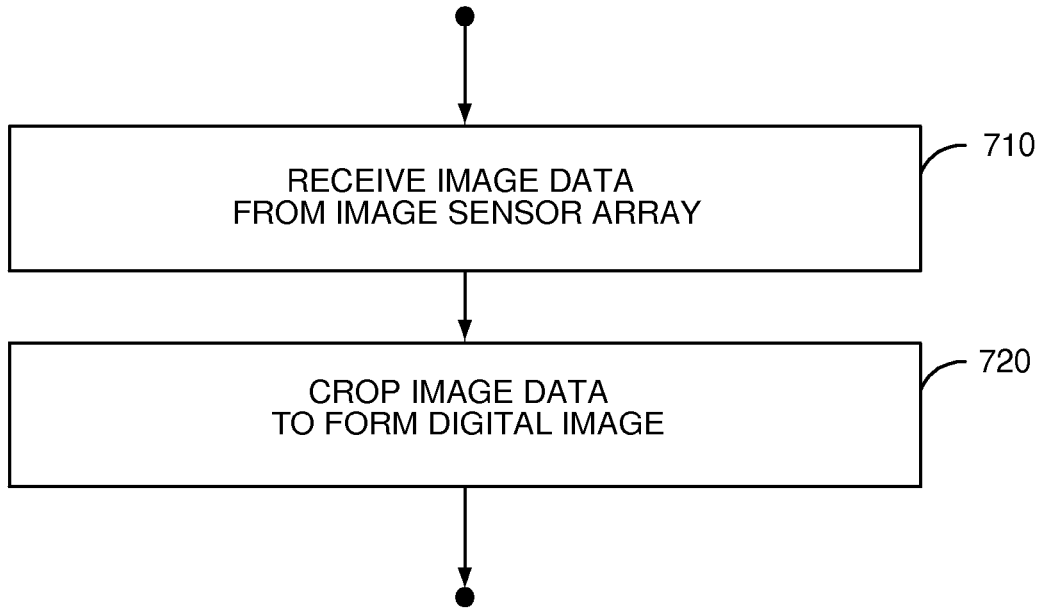
FIGS. 7A and 7B are flow diagrams depicting processes for creating digital images using an image sensor.
Figure 7B:
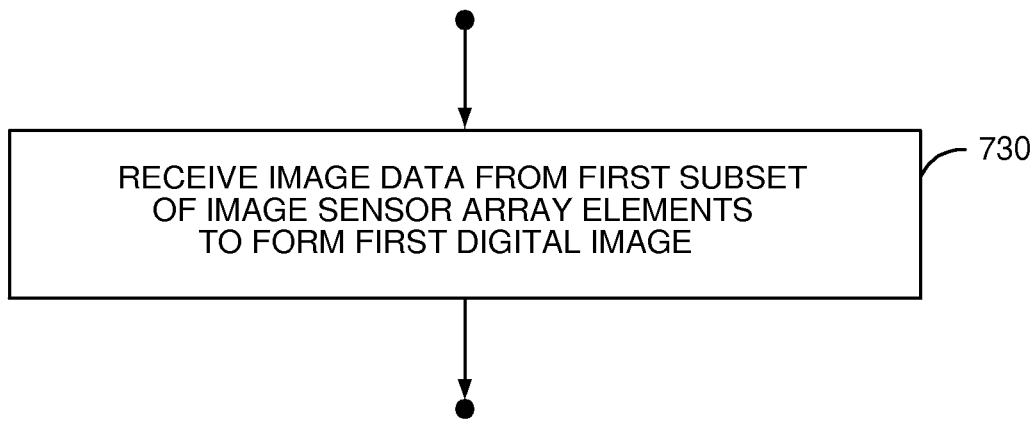

Alternative embodiments of a method for capturing digital images are depicted in FIGS. 7A and 7B. In the first approach, illustrated in FIG. 7A, the entire sensor array 221 of image sensor 220 may be employed during each image capture. As explained above, the resulting image may include a reflection artifact 515, and must therefore be cropped to remove the artifact. Thus, Block 710 depicts the receiving of image data from image sensor array 221, followed by Block 720, which depicts cropping of the image data to form a digital image. The output of the two-step process depicted in FIG. 7A is thus a cropped digital image, such that the reflection artifact 515 has been removed by the cropping step. As described above, this is done with a first illumination (from a first illumination angle) to produce a first digital image, as in Block 620 of FIG. 6. The process of FIG. 7A may then be repeated at block 640, with a second illumination (from a second illumination angle), to provide a second digital image. The cropped first and second digital images are then combined at Block 650 to form the composite digital image.

Alternatively, the image sensor 220 may be configured so that a given image may be captured using less than the full sensor array 221. Using this approach, buffer memories, used to hold image data during processing, may be smaller and thus less expensive. Accordingly, at Block 730 of FIG. 7B, the image capture process comprises receiving image data from a subset of the image sensor array elements 221 of image sensor 220. Referring back to FIG. 6, a first digital image may thus be captured at Block 620 using a subset of sensor array elements 221 corresponding to a right-hand portion of the image area 320. Because the illumination during this first image capture is from the left-hand side, the reflection can thus be excluded from the captured image.

At Block 640, a second digital image, using a subset of sensor array elements 221 corresponding to a left-hand portion of the image area 320, is captured. Again, the reflection from light source 230 may be excluded completely from the resulting image. This second digital image may be combined with the first digital image at Block 650 to create the composite digital image. Again, the resulting composite digital image, which may cover the entire imaging area 320, will be free from reflection artifacts 515.

In the process just described, the subset of sensor array 221 employed in the first image capture may be mutually exclusive of the subset employed in the second image capture. In other words, the first captured image may not overlap with the second captured image. In this case, the combining of the first and second digital images may be as simple as abutting the two images to create a composite digital image.

Figure 8:
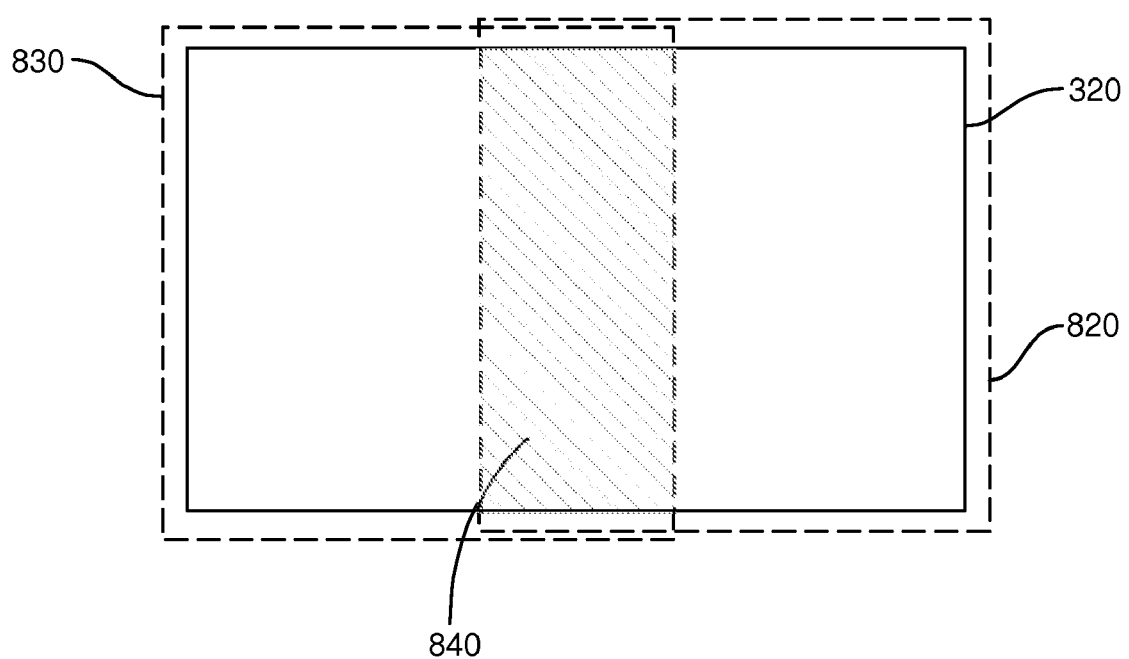
FIG. 8 illustrates captured digital images and their correspondence to an image area.

However, it may be advantageous to select the first and second subsets so that the first and second digital images comprise an overlap region. FIG. 8 illustrates a first digital image 820 captured using the process depicted in FIG. 7B, i.e. using a first subset of the sensor array elements 221 of image sensor 220. In FIG. 8, digital image 820 is overlaid upon and covers more than half of the image area 320. Also pictured in FIG. 8 is a second digital image 830, captured using a second subset of sensor array 221. This second subset is selected so that the resulting image 830 corresponds roughly to the opposite half of the image area 320, and overlaps image 820. Thus, images 820 and 830 each comprise a non-overlapping portion, and each includes an overlap region 840.

Figure 9A:
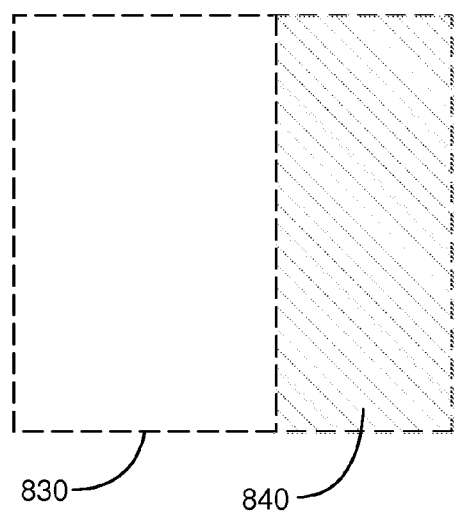
FIGS. 9A-9C illustrate processing of captured digital images to form a composite digital image.
Figure 9A:
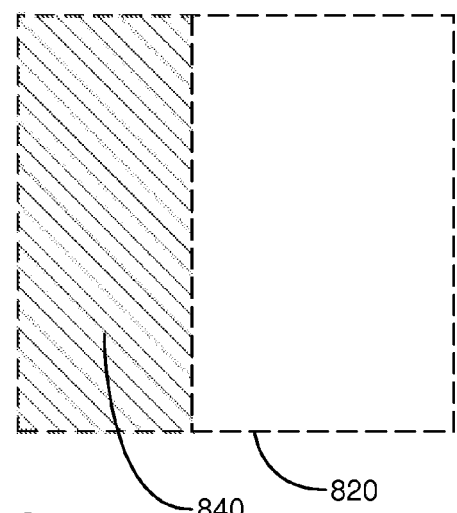
Figure 9B:
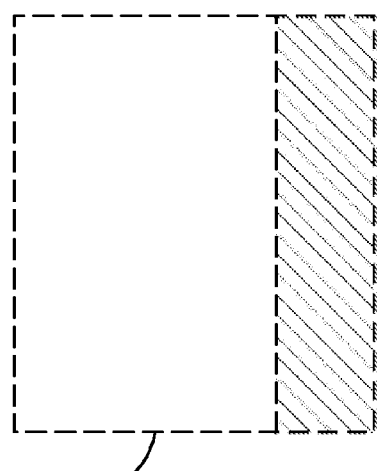
Figure 9B:
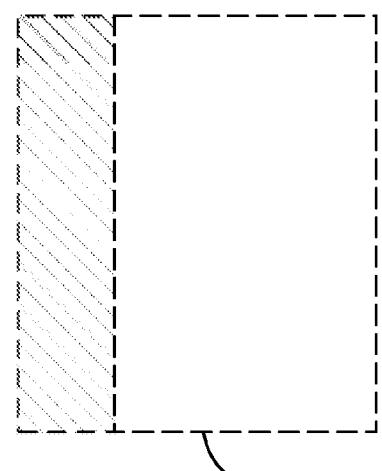
Figure 9C:
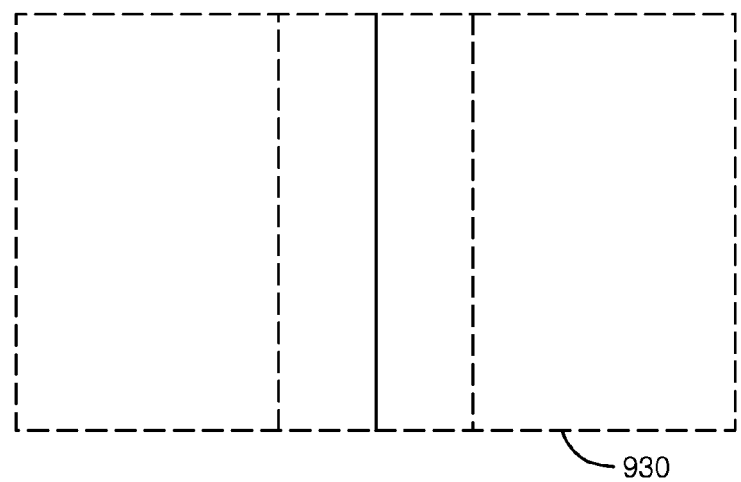

Several approaches to combining images 820 and 830 may be taken. In the first, one or both of the first and second digital images may be cropped, so that the composite digital image may be formed by simply abutting the cropped images. In FIG. 9A, uncropped digital images 820 and 830 are shown, each having an overlap region 840. In FIG. 9B, cropped images 910 and 920 are illustrated. The cropped images each retain a portion of the overlap region 840. FIG. 9C illustrates the composite digital image 930 formed by simply abutting the cropped images 910 and 930. Although FIGS. 9A-9C illustrate cropping using a straight-line, other approaches are possible. For example, a shingling approach, wherein the cropping is done using a tooth-like line, rather than a straight line, may be used. This approach may reduce discontinuities caused by slight differences between the illuminations of the first and second digital images. A saw-tooth cropping line might also be used.

Figure 10:
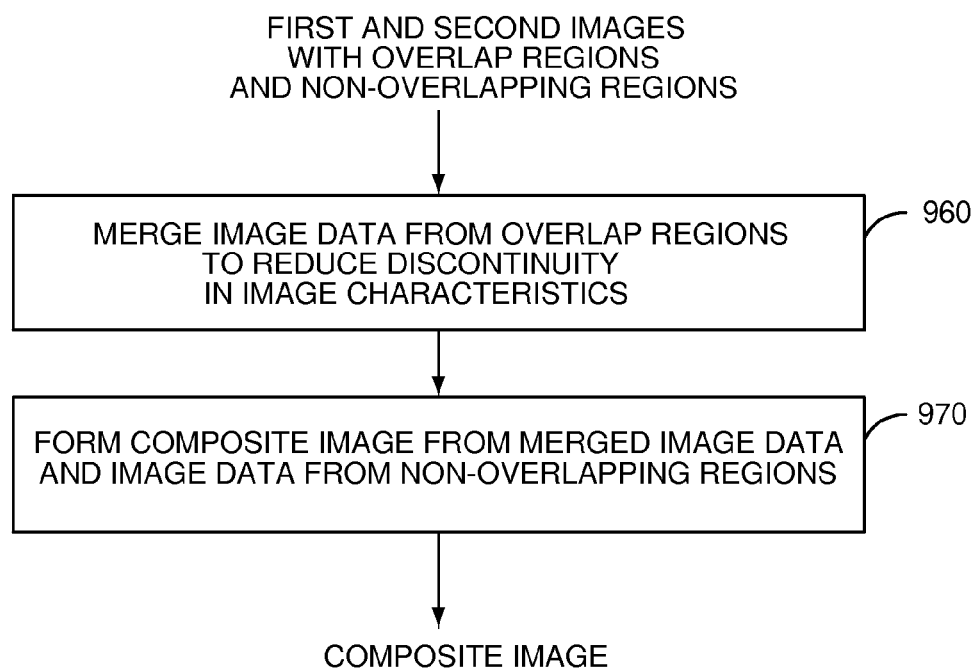
FIG. 10 is a flow diagram depicting a process for combining captured images comprising an overall region.

In yet another embodiment, image data from the overlap region in the first and second digital images may be merged to reduce potential discontinuities. FIG. 10 illustrates a flow diagram for this procedure. Blocks 960 and 970 correspond to block 650 of FIG. 6, for some cases in which the first and second images digital images comprise an overlap region 840 and non-overlapping regions. In block 960, image data from the overlap region 840 is merged to reduce discontinuities in the image. For example, color and/or luminance data from corresponding pixels in each of the first and second digital images may be averaged. The averaging might be performed with varying weights, so that data from the top image 830 is weighted more heavily near the top end of the overlap region 840, and less heavily at the bottom end of overlap region 840. Data from the overlap region 840 of the lower image 820 might be weighted in the opposite manner. Various alternative schemes for merging data corresponding to the overlap region 830 will be apparent to those skilled in the art. In block 970, then, a composite image is formed from the resulting merged data and data corresponding to the non-overlapping regions.

Figure 12:
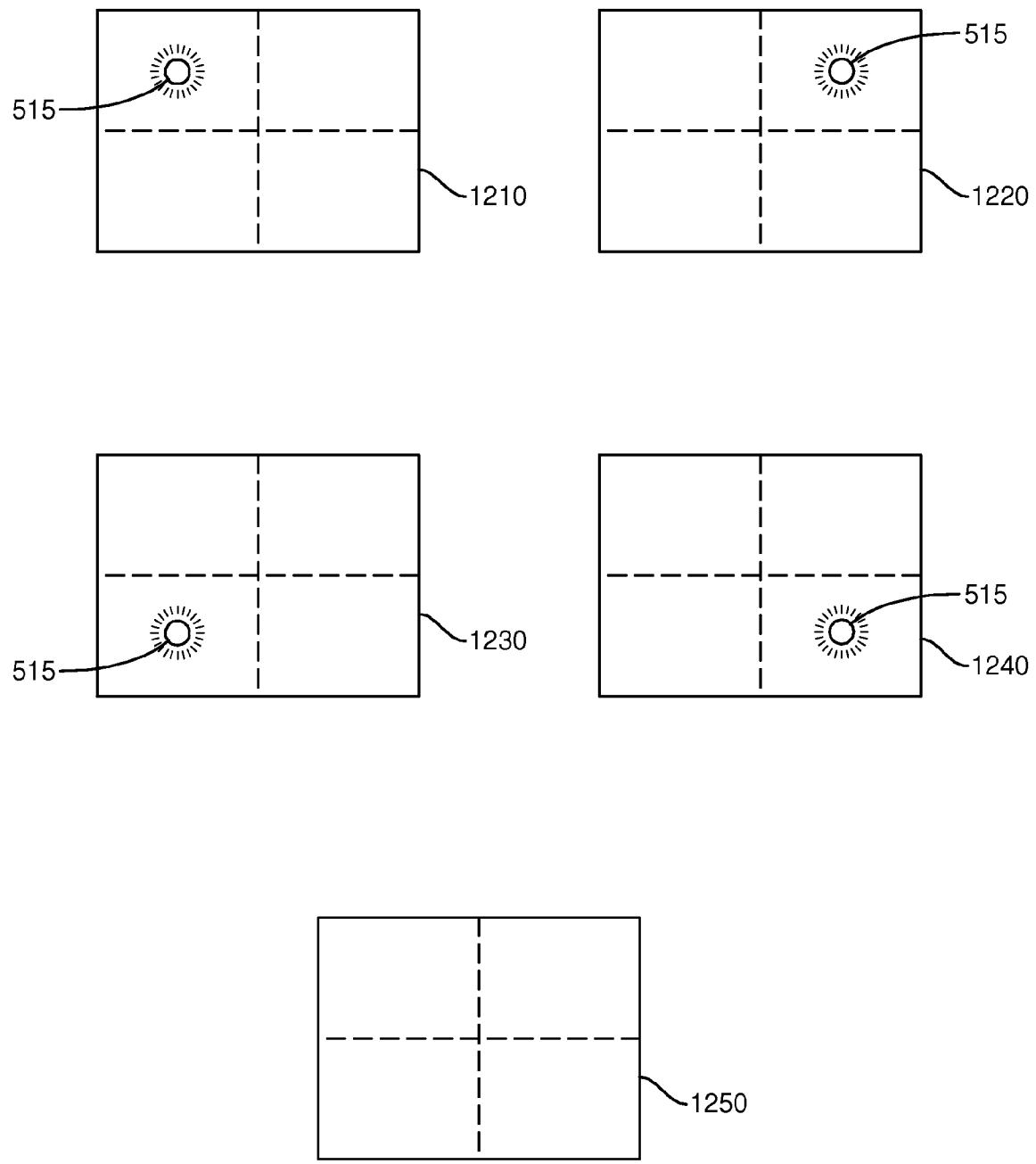
FIG. 12 illustrates images corresponding to the sequential illumination of light sources.

Although the embodiments discussed above each employ two light sources 230, illuminated sequentially during the capture of a first and second digital image, the use of additional light sources, with the capture of additional corresponding digital images is possible. For example, four light sources 230 might be positioned around the rectangular image area 320. In this embodiment, four digital images, corresponding to the sequential illumination of the four light sources 230, might be captured, as shown in FIG. 12. Digital images 1210, 1220, 1230 and 1240 each contain an illumination artifact 515, the position of which depends on the disposition of the light sources 230 relative to scan bed 310 and image sensor 220. Those skilled in the art will immediately see how the cropping processes and/or the selection of subsets of sensor array elements 221 may be modified to accommodate this configuration, in order to produce a composite image 1250 free from illumination artifacts 515.

The light sources 230 may employ, for example, incandescent bulbs, or cold-cathode fluorescent lighting technology (CCFL). A single light source 230 may employ one light element, or several disposed closely together to form a single effective source of light. In some embodiments, it may be advantageous to form a light source so that the image area 320 is not directly illuminated by the light source, but light is instead reflected onto image area 320.

Figure 11A:
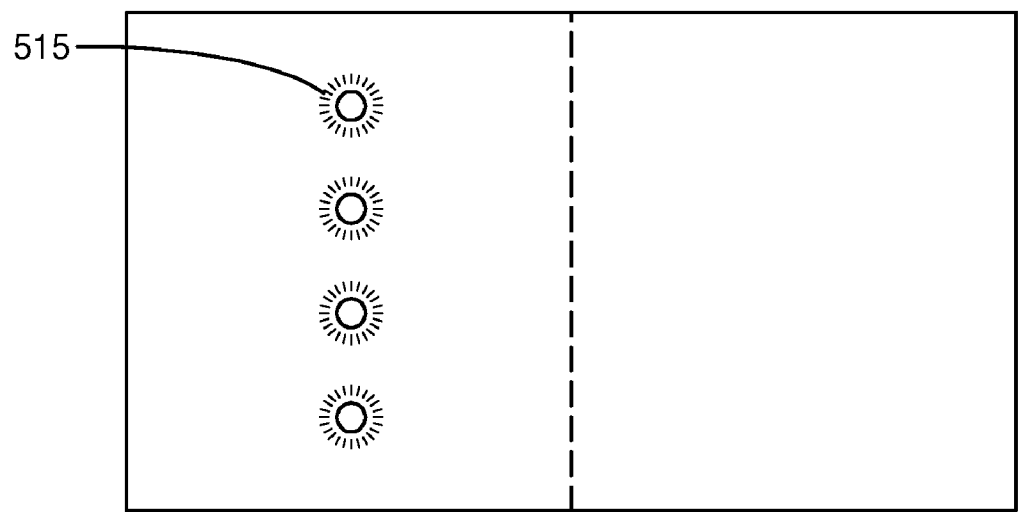
FIGS. 11A-B illustrate images captured using illumination from a linear array of LED light sources.
Figure 11B:
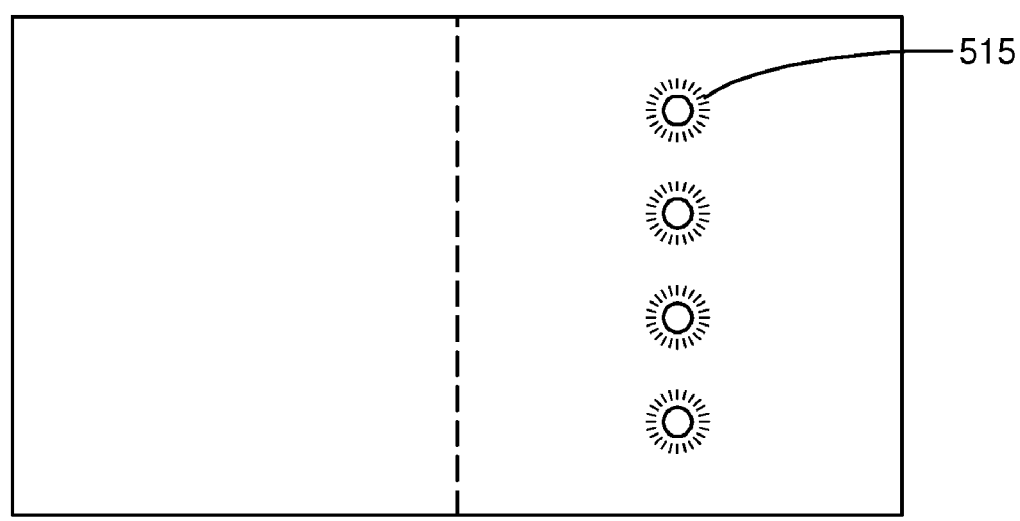

In yet another embodiment, a first light source 230 may comprise an array of LEDs positioned to illuminate scan bed 310 from an illumination angle β, and a second light source 230 may comprise an identical array of LEDs positioned to illuminate the target bed 310 from an opposite angle. Referring to FIG. 4, in this embodiment each LED array 230 would be disposed perpendicularly to the view of FIG. 4. The resulting reflection artifacts 515 would thus appear as in FIGS. 11A and 11B.

The image sensor 220 employed in any of the above-described embodiments may comprise image-processing circuitry in addition to the image sensor array 221. This circuitry may include hardware and firmware configured to process image data received from image sensor array 221; this processing may include, as non-limiting examples, image compensation or image compression, and may be carried out under the control of CPU 270. Image sensor 220 may additionally include buffer memory for temporarily storing image data, whether before or after processing.

The processing of digital images described herein may be carried out in CPU 270, using program code 278 stored in memory 275, or may be carried out, in whole or in part, in any appropriately configured processing element. Those familiar with conventional image processing techniques will be aware of the various hardware and software configurations available for such processing, and the advantages and disadvantages of each.

As suggested above, the exemplary imaging device 100 shown in FIGS. 1 and 2 may include other components and other functionality. Various imaging or printing functions may be initiated using user interface 130. A user controlling user interface 130 may cause images captured by the methods described herein to be sent to external computers, using the modem 280 and/or communication port 245. The display 134 may be embodied as an alphanumeric or graphical LCD display and keypad 136 may be an alphanumeric keypad. Alternatively, the display and input functions may be implemented with a composite touch screen (not shown) that simultaneously displays relevant information, including images, while accepting user input commands by finger touch or with the use of a stylus pen (not shown).

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of generating an image of a document disposed on a target bed, comprising:
    capturing a first digital image of the document using illumination from a first illumination angle;
    capturing a second digital image of the document using illumination from a second illumination angle;
    combining the first and second digital images to obtain a composite digital image of the document free of reflection artifacts corresponding to the first and second illumination angles; and
    calculating a weighted average of image data from an overlap of the first digital image and the second digital image in the composite digital image,
    wherein the first digital image corresponds to a first section of the document, the second digital image corresponds to a second section of the document overlapping said first section, and wherein the calculating the weighted average is performed such that the image data from the first section are weighted more heavily in a top end of the overlap.

2. The method of claim 1, wherein capturing the first digital image comprises capturing color plane images corresponding to a sequence of differently colored illuminations and processing the color plane images to form the first digital image.

3. The method of claim 1, wherein capturing the first digital image comprises receiving first image data from a first subset of image sensor elements disposed in an image sensor, and wherein capturing the second digital image comprises receiving second image data from a second subset of said image sensor elements; wherein said first and second subsets of image sensor elements are at least partially non-overlapping.

4. The method of claim 1, wherein capturing a first digital image of the document using the first illumination angle comprises capturing the first digital image using light reflected from the first illumination angle.

5. The method of claim 1, wherein said first and second sections of the document are at least partially non-overlapping.

6. The method of claim 1, further comprising capturing one or more additional digital images of the document using illumination from corresponding one or more additional illumination angles, wherein combining the first and second digital images to obtain a composite digital image of the document comprises combining the first and second digital images with the one or more additional digital images to obtain a composite digital image of the document free of reflection artifacts corresponding to the first, second, and one or more additional illumination angles.

7. An imaging device comprising:
    a target bed;
    a first illumination source disposed to illuminate a document positioned on the target bed from a first illumination angle;
    a second illumination source disposed to illuminate said document from a second illumination angle;
    an imaging unit disposed to capture a first digital image of said document using illumination from the first illumination source and to capture a second digital image of the document using illumination from the second illumination source; and
    an image-processing unit configured to combine the first and second digital images to obtain a composite digital image of the document free from reflection artifacts corresponding to the first and second illumination angles and to calculate a weighted average of image data from an overlap region of the first digital image and the second digital image in the composite digital image;
    wherein the first digital image corresponds to a first section of the document, the second digital image corresponds to a second section of the document overlapping said first section, such that the first and second digital images each comprise said image data corresponding to the overlap region, and wherein the calculating the weighted average is performed such that said image data from the first section are weighted more heavily in a top end of the overlap region.

8. The imaging device of claim 7, wherein the first illumination source comprises one of a plurality of light-emitting diodes, an incandescent light, and a cold cathode fluorescent light.

9. The imaging device of claim 7, wherein the first illumination source comprises a reflector disposed to reflect light onto the document from the first illumination angle.

10. The imaging device of claim 7, wherein the first illumination source comprises a plurality of individually selectable colored light sources.

11. The imaging device of claim 10, wherein the imaging unit is configured to capture color plane images corresponding to a plurality of sequential colored illuminations and to process said color plane images to form the first digital image.

12. The imaging device of claim 7, wherein the imaging unit is configured to receive first image data for the first digital image from a first subset of image sensor elements disposed in the imaging device and to receive second image data for the second digital image from a second subset of said image sensor elements, wherein said first and second subsets of image sensor elements are at least partially non-overlapping.

13. The imaging device of claim 7, further comprising a light shield disposed to prevent light from the first illumination source from directly illuminating the second illumination source.

14. The imaging device of claim 7, further comprising
one or more additional illumination sources disposed to illuminate a document positioned on the target bed from one or more additional illumination angles; wherein the imaging unit is further disposed to capture one or more additional digital images of said document using corresponding illumination from each of the one or more additional illumination angles, and is configured to obtain a composite digital image by combining the first, second, and one or more additional digital images such that the composite digital image is free from reflection artifacts corresponding to any of the first, second, and one or more additional illumination angles.

15. A method of generating an image of a document disposed on a target bed, comprising:
capturing a first digital image of the document using illumination from a first illumination angle, wherein the first digital image contains a first reflection artifact corresponding to the first illumination angle;
capturing a second digital image of the document using illumination from a second illumination angle, wherein the second digital image contains a second reflection artifact corresponding to the second illumination angle;
cropping the first and second digital images to obtain cropped digital images, wherein the cropped digital images are free of reflection artifacts;
combining the cropped digital images to obtain a composite digital image; and
calculating a weighted average of image data from an overlap of the first and second digital images in the composite digital image,
wherein the first digital image corresponds to a first section of the document, the second digital image corresponds to a second section of the document overlapping the first section, and wherein the calculating the weighted average of the image data is performed such that the image data from the first section are weighted more heavily in a top end of the overlap.

16. The method of claim 1, wherein capturing the first digital image comprises receiving the image data from a plurality of image sensor elements and cropping the received image data to form the first digital image.

17. The imaging device of claim 7, wherein the imaging unit is configured to receive image data for the first digital image from image sensor elements disposed in the imaging device and to crop said image data to form the first digital image.

* * * * *